July 23, 1929. G. H. HARTMAN 1,722,087
WIRE STRIPPING MACHINE
Filed March 19, 1925 3 Sheets-Sheet 2

INVENTOR
George H Hartman

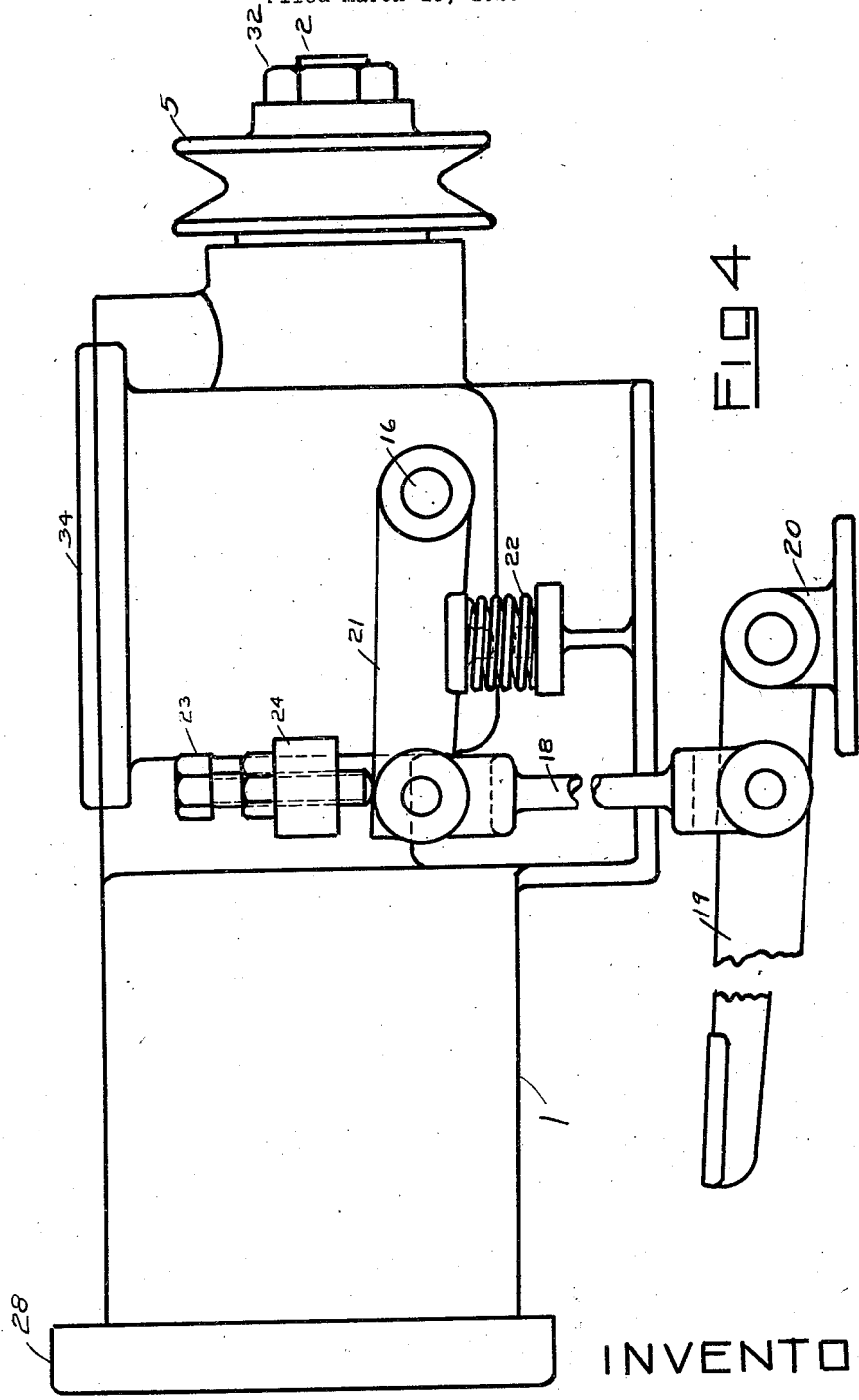

Patented July 23, 1929.

1,722,087

UNITED STATES PATENT OFFICE.

GEORGE H. HARTMAN, OF CLEVELAND, OHIO.

WIRE-STRIPPING MACHINE.

Application filed March 19, 1925. Serial No. 16,602.

This invention relates to wire stripping machine to strip the insulation from the ends of insulated electric wire.

An object of the invention is to provide a simple compact machine for use where numbers of ends of wire have to be stripped and a machine that will do this in a better and faster manner than is now possible by hand stripping.

Another object of the invention is to provide in a machine of this class, a machine that will twist the strands of stranded wire together during the operation of stripping, thereby making the stripped end ready for the fastening of the terminal connection.

Another object of the invention is to provide a machine that during the stripping operation will polish the stripped end of the wire free of dirt and other foreign matter so that the terminal connection may be the more easily soldered thereon.

Another object of the invention is to provide adjustments that will permit a single machine to strip wire of varying diameter.

Another object of the invention is to provide adjustments which will permit of many sharpenings of the cutting knives, used to cut the insulation, without destroying the setting of the knives, in their relation to the wire during a stripping operation.

Further objects and advantages of the invention are apparent from the following detailed description.

While the invention in its broader aspect is capable of embodiment in different forms a preferred embodiment thereof, and of the mechanism forming the same are illustrated in the accompanying drawings, in which:

Figure 4 is an elevation of the operating side of the machine with the foot operating means shown thereon.

Figure 5:
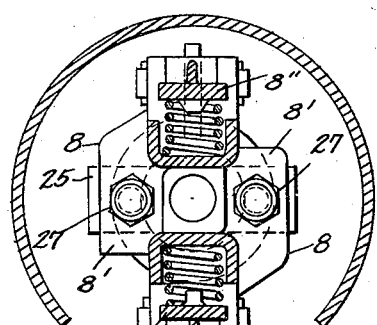
Figure 5 is a cross section taken along the line 5—5 in Figure 1.

Referring to the drawings, 1 (Fig. 1) designates a cast case to hold the operating portions of the machine, and into which they are mounted. Mounted in bearings 3 and 4 of the case 1 is a shaft 2, this shaft being guided for rotary movement therein and receiving rotation as shown in the present instance, from a pulley 5, mounted on the outer end of the shaft and external of the case. It is evident that other means of driving this shaft 2 could be used, for instance an electric motor. The case 2 is divided into two main sections the portion nearest the pulley 5 being sealed for the retention of lubricant, and the other section being cut away in part to provide a passage for the waste insulation (Fig. 5) as is hereafter more completely disclosed.

Figure 1:
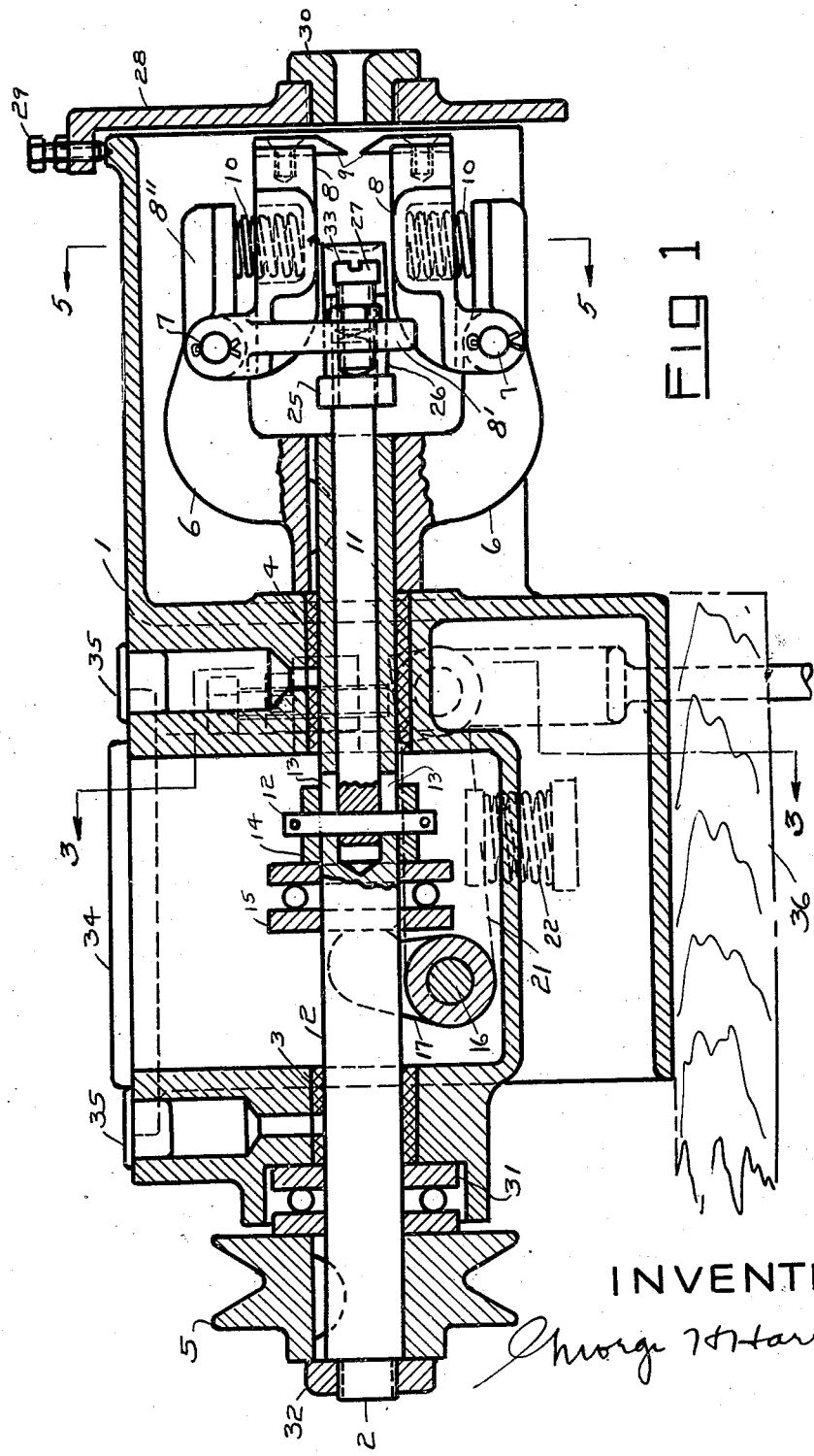
Figure 1 is a cross sectional elevation of the machine.
Figure 2:
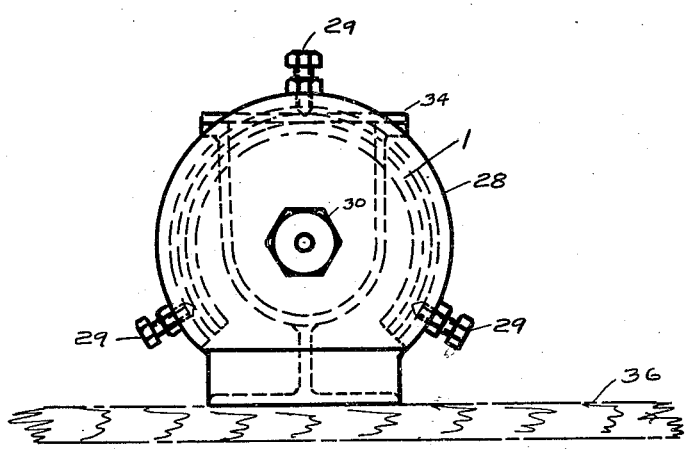
Figure 2 is a front end view, to reduced scale.
Figure 3:
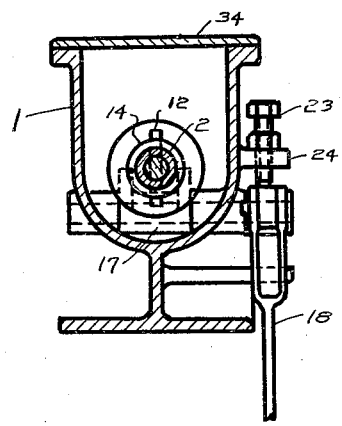
Figure 3 is a cross section taken along the line 3—3 in Figure 1, to reduced scale.

Mounted on the end of the shaft opposite the pulley end and fixed therewith for rotation, is a yoked member 6. (Fig. 1.) Two pivot bosses 7 are provided in this yoked member and mounted therein are bell cranks 8. Fixed at the outer outwardly extending end of each bell crank is a cutting knife 9. Extending upwardly from the extending arm of the bell crank and mounted into a cupped portion thereof is a coil spring 10. This coil spring bears against an extending portion of the yoked member 6, and the spring of each bell crank serves to press its respective knife 9 into the center line of the machine.

The end of the shaft 2, which carries the yoked member 6 is drilled, into which drilled hole is inserted a shaft 11. This shaft 11 is guided for endwise reciprocatory movement in the shaft 2. At the rear end of the shaft 11 is a pin 12. This pin 12 passes thru the shaft 11, and extends out thru the slots 13 in each side of the shaft 2, into and thru the collar 14. This collar 14 is mounted on the shaft 2, for sliding reciprocatory movement therewith. Co-acting with the collar 14 is a thrust bearing 15, mounted over the shaft 2 and having sliding reciprocatory movement therewith. Journaled in bearings at each side of the case 1, is a shaft 16, carrying at its central portion, and internal of the case 1, a two armed lever 17, the outer end of each arm of this lever being in contactal relation to the thrust bearing 15. The shaft 16 extends to one side of the case, upon which extension is mounted a lever horizontal arm 21, (Fig. 4). At the outer end of this lever arm is connected the upper end of the rod 18. The lower end of the rod 18 is connected to the foot lever 19, which lever is mounted in a convenient manner on the floor and is pivoted in a suitable bracket 20. The lever arms 17 and 21 are fixed by pins or keys to the shaft 16, so that upon a downward movement of the foot lever 19, the lever arm 17 will be pressed against the thrust bearing 15, causing same to slide on the shaft 2, rearwardly of the machine front against the collar 14, thereby imparting a longitudinal travel to the pin 12, in the slots 13, with a corresponding longitudinal movement of the shaft 11. It is evident that a releasing of the pressure on the foot lever 19 will bring a reverse of this movement of the lever arm 17, and to counterbalance the weight of the foot lever and the rod 18 I have provided in the present instance a coil spring 22 mounted between a projecting ledge extending outwardly from the side of the base 1, and a boss on the lower side of the lever 21, (Fig. 4). To limit the upward movement of the lever 21, I have provided a stop screw 23, carried in a boss 24 extending outwardly from the side of the case 1. The further purpose of this screw 23 is as hereinafter explained.

The front end of the shaft 11 is threaded and carries on this threaded portion a block 25, and a collar 26. Mounted in each arm 8' of the bell crank 8 which arms 8' each extend toward the shaft 11 and are disposed on opposite sides thereof is a screw 27, (Fig. 5) and (Fig. 1). It is evident that upon a movement of the shaft 11 toward the machine front that the block 25 will press against the screws 27 with the result that the bell cranks 8 will be rotated about their respective pivots, and the forwardly extending arms 8'' of the bell cranks will be moved outwardly away from the shaft 11. It is evident that during this movement that the coil springs 10 will be compressed, and that upon a reverse movement of the shaft 11, these coil springs 10 will return the forwardly extending arms of the bell cranks 8 to a position towards the center line of the machine, and that this returning movement of the coil springs will cause the screws 27 to press against the block 25 and this in turn cause the thrust bearing 15 to move towards and co-act with the lever arm 17. It is now evident that a pressing down of the foot lever 19 will open the cutting knives 9 and that a releasing of the foot lever, permitting it to return to its original position will bring the knives together. It is also evident that the amount of distance that the knives are permitted to come together is regulated by an adjustment of the screw 23 which adjustment can be effected during stripping operation of the machine.

On the front end of the case 1, (Fig. 1) is mounted a cover plate 28. This plate is carried on the case by means of three screws 29. It is evident that by means of adjustments provided by these screws 29, that the center of the cover plate can be shifted at will to coincide with the center line of the case 1, and that by reason of this adjustment rough castings may be used. In the center of the plate 28 is a tapped hole into which is screwed a pilot bushing 30. This bushing 30 is drilled with a hole of suitable size for the wire that is to be stripped.

To take the thrust load incident to a pressing downward of the foot lever 19, I have provided in the present instance a thrust bearing 31, to which the thrust load is carried from the shaft 2, by means of the hub of the pulley 5 and the nut 32 on the end of the shaft. It is evident that if the pulley were pinned to the shaft instead of being keyed as in the present instance that this nut on the end of the shaft could be eliminated.

Screwed into the front end of the collar 26 is a gauge pin 33, against which the wire to be stripped is fed into. The screwing in or out as the case may be of this pin 26 determines the amount of wire that is exposed to the stripping action of the knives 9. A cover 34 is mounted over the rear end of the case 1, to keep out dirt and to retain the lubricant disposed internal of this portion of the case. This cover is fastened to the case by screws or in any other suitable manner. Oil cups 35 are provided for each of the bearings in which the shaft 2 is revolved. The front portion of the case 1 is cut away to provide an outlet for the waste stripping and the machine is mounted as shown in Fig. 1, so that this cut out portion of the case extends over the edge of the bench 36, the waste stripping thereby being permitted to fall onto the floor.

The operation of the machine is as follows: The adjusting screws 23 and 27 are set so that the cutting knives 9 are opened the exact amount required for the size of wire to be stripped, and also so that each edge of each knife is the same distance from the center line of the machine. Power is then applied to the machine and the shaft 2, and the parts carried thereon, are caused to rotate at a high speed. The foot lever is then pressed, opening the knives and the end of the wire to be stripped is inserted thru the bushing 30, and up against the gauge pin 33. The pressure is now removed from the foot lever 19 and the knives permitted to close in around the wire. The setting of the adjustment screws has been made so that the knives in closing in cut into the insulation but not into the wire. The wire is now pulled from the machine, against the rotating cutting knives 9. This action causes the insulation to be cut and stripped away from the wire, and in the case of stranded wire the rotation of the cutting knives produces a twisting movement to the stripped end of the wire and the strands are twisted into one tight strand. It is also evident that the adjustment screw 23 can be so regulated that the knives close in on the wire enough to permit the knives to polish the wire free of dirt and oxides. It is also evident that the adjustment screws 27 permit one knife to be sharpened and ground away independent of the other knife, as with this adjustment each knife can be regulated in its setting in relation to the center line of the machine, independent of the other knife. It is also evident that for correct operation of the machine the knives must at all times revolve on the center line of the machine and the center line of the bushing 30.

I wish it understood that the particular form of mechanism with which I have clothed my invention, and the different parts thereof illustrated and described, are merely typical means of carrying my invention into effect, and that the specific construction described herein is merely by way of illustration and not by limitation or narrowing of my claims, as obviously, changes in construction and design can be made without departing from my invention, and such changes are contemplated by me, and would not involve any departure from my invention.

Having thus described my invention what I claim as new and desire to secure by Letters Patent, is:

1. In a machine of the class described, a retaining case, a revolving member therein, means to revolve the revolving member, a pair of knives mounted on the revolving member, means to open and close the knives, a front cover plate for the retaining case adapted to receive bushings for guiding the wire, and means to adjustably connect the cover plate to the case to bring the bushing central with respect to the pair of knives.

2. In a wire stripping machine, a rotatable member, a sliding shaft having an abutment, a pair of spring tensioned bell cranks pivoted to the member and having wire strippers on one of their arms, the other arms of the bell cranks extending on opposite sides of the shaft, means carried by the last named ends of the bell cranks and engageable with the abutment so as to be operated thereby to move the strippers away from one another, and means to slide the shaft.

3. In a wire stripping machine, a rotatable member, a sliding shaft having an abutment, a pair of spring tensioned bell cranks pivoted to the member and having wire strippers on one of their arms, the other arms of the bell cranks extending on opposite sides of the shaft, means carried by the last named ends of the bell cranks and engageable with the abutment so as to be operated thereby to move the strippers away from one another, and means to slide the shaft including a spring tensioned depressable lever, means to depress the lever, and adjustable means to limit upward movement of the lever to restrict sliding movement of the abutment and thereby closing movement of each of the strippers.

In testimony whereof I affix my signature.

GEORGE H. HARTMAN.